United States Patent Office 2,717,977
Patented Sept. 13, 1955

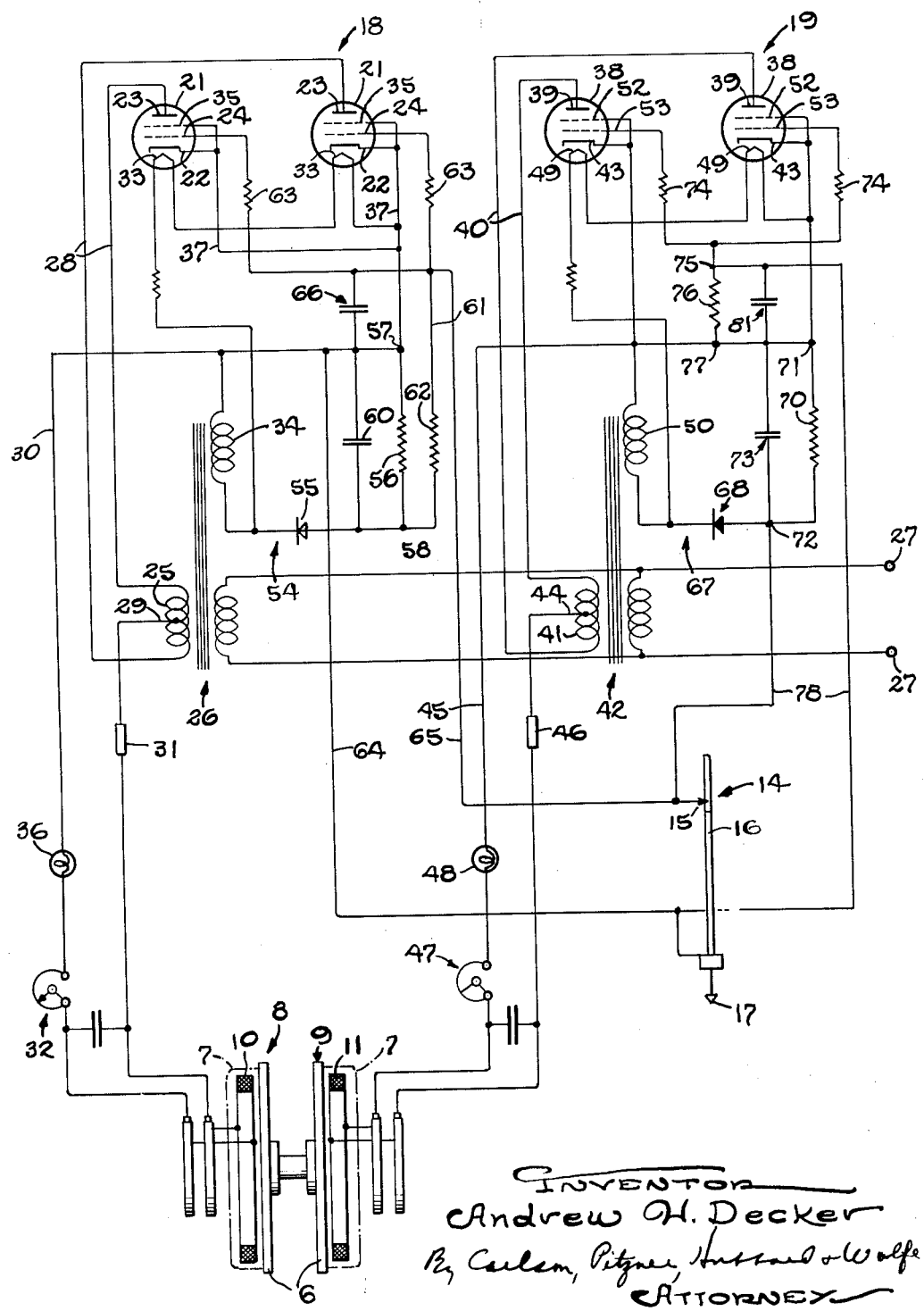

2,717,977

PULSATING CONTROL FOR ELECTROMAGNETS

Andrew H. Decker, Beloit, Wis., assignor to Warner Electric Brake & Clutch Company, South Beloit, Ill., a corporation of Illinois Application July 28, 1952, Serial No. 301,421

4 Claims. (Cl. 317—123)

This invention relates generally to a control for electromagnets and, more particularly, to a control for two electromagnets such as the magnets of two electromagnetic friction clutches arranged in a reversible drive to move a driven member in one direction when the winding of one clutch is energized and in the opposite direction when the winding of the other clutch is energized.

The primary object of the invention is to provide a novel electronic control by which two electromagnets may be energized alternately in extremely rapid succession, one magnet always being energized when the other is deenergized.

A more detailed object is to energize the windings of the electromagnets alternately through the medium of gas-filled rectifier tubes whose circuits are arranged in a novel manner for conduction by one or the other of the tubes in response to the opening and closing of a single sensitive switch.

Other objects and advantages of the invention will become apparent from the following detailed description taken in connection with the accompanying drawing which is a schematic wiring diagram of a control embodying the novel features of the present invention.

The invention is especially adapted for use in controlling the operation of a reversible drive mechanism to cause an actuated device such, for example, as the tool of a profiling machine to follow closely the changes in a controlling condition such as the position of a tracer element as the latter encounters different successive portions of a pattern contour. For such typical uses, the improved control may, as shown in the drawing for purposes of illustration, be arranged to govern the selective and alternate energization of the windings 10 and 11 of two coaxially arranged friction clutches 8 and 9 each being of well known construction and comprising an annular magnet core 7 enclosing one of the windings and adapted for axial gripping engagement with one of two armatures 6 which are coupled together and adapted for connection to the part to be actuated. Thus, if the magnets are rotated in opposite directions, the actuated part will be moved in one direction or the other depending on which of the windings 10 and 11 is energized. Such control of the windings may be effected through a switch 14 arranged for response to deviations in a controlling condition. While the switch may take various forms, it is shown in the present instance as comprising an adjustable contact 15 and a column 16 of mercury which is movable into and out of engagement with the contact to close and open the switch respectively in response to the movements of a control instrumentality which may comprise the stylus 17 of a profiling machine.

In accordance with the present invention, a novel electronic network is provided for energizing the windings 10 and 11 alternately and rapidly in response to opening and closing of the switch 14. This is accomplished by electronic rectifiers 18 and 19 the first of which is rendered conductive to supply current to the winding 10 when the switch is closed and non-conductive when the switch is opened and the second of which is rendered conductive to supply current to the other winding 11 when the switch is opened and non-conductive when the switch is closed.

The first rectifier 18 for the winding 10 is preferably of the full wave type comprising two gas-filled thyratron tubes 21 each having an output or load circuit connected between the cathode 22 and the plate 23 of the tube and an input or control circuit connected between the cathode and the control grid 24 of the tube. Current for energizing the winding is derived from the secondary winding 25 of a transformer 26 by which a primary voltage of a source 27 is changed to a desired value such, for example, as 440 volts. The plates 23 of the tubes are connected to opposite end terminals of the secondary winding through conductors 28 while the cathodes 22 are connected to the center tap 29 of the secondary winding through conductors 37 and a common conductor 30. To complete the load circuits for the tubes, the common conductor 30 includes in series a fuse 31, the clutch winding 10, and a manually adjustable rheostat 32 for controlling the value of the voltage applied to the winding. The thyratron tubes are the type having separate heaters 33 which herein are connected across another secondary winding 34 by which the primary voltage is stepped down to a suitable value, for example, 15 volts. The screen grids 35 of the tubes are connected directly to the cathodes.

To overcome the inductance of the clutch winding 10 quickly and reduce the time required for the flux in the magnet to build up to its normal operating value, a momentary surge of current substantially higher than the normal operating current for the winding is applied to the latter by connecting an incandescent lamp 36 of suitable rating such as 50 watts in series with the winding. Such a lamp has a resistance whose value increases instantaneously following energization due to a correspondingly rapid increase of its temperature. The values of the resistances of the lamp, the winding, and the rheostat are correlated with the output of the rectifier tubes to produce the normal operating voltage across the winding after the filament of the lamp has attained its maximum temperature.

The rectifier 19 for the other clutch winding 11 is similar to the rectifier 18 for the winding 10 as thus far described and is also of the full wave type including two gas-filled thyratron tubes 38 whose plates 39 are connected through conductors 40 to opposite end terminals of the secondary winding 41 of a transformer 42 having a primary winding connected across the same source 27 as that of the transformer 26. The cathodes 43 of the tubes are connected to the center tap 44 of the transformer secondary winding through a common conductor 45 which includes in series a fuse 46, the clutch winding 11, a manually adjustable rheostat 47, and an incandescent lamp 48 similar to that described above. The heaters 49 of the tubes are connected across another secondary winding 50 of the transformer 42 similar to the secondary heater winding 34 of the first transformer and the screen grids 52 are connected directly to the cathodes. To smooth the pulses of direct current flowing through the clutch windings when the tubes of their associated rectifiers are conducting, a filtering capacitor of suitable size such, for example, as 4 microfarads may be connected in parallel with each of the windings.

To effect the alternate energization of the clutch windings 10 and 11 in response to opening and closing of the switch 14 as contemplated by the invention, means is provided for rendering the tubes 21 of the first rectifier 18 conductive when the switch is closed and non-conductive when the switch is open, the tubes 38 of the second rectifier being rendered conductive when the switch is open and non-conductive when the switch is closed. This means comprises circuits including the switch 14 for applying the same potential to the control grids 53 and cathodes 43 of the second rectifier tubes 38 and a negative potential to the control grids 24 of the first rectifier tubes when the switch is open and reversing such application of potentials when the switch is closed. Thus, under the latter condition, the same potential is applied to the control grids 24 and cathodes 22 of the first rectifier tubes 21 and a negative grid bias is applied to the tubes 38 of the second rectifier 19.

In the present instance, each of the rectifiers 18 and 19 has a separate source of negative grid bias for its tubes, the source 54 for the first rectifier comprising the heater secondary winding 34 of the transformer 26 in series with a selenium rectifier 55 and a fixed resistance 56 having positive and negative terminals 57 and 58 and a filtering capacitor 60 connected across these terminals. The conductors 37 of the cathodes 22 are connected to the positive terminal 57 of the fixed bias resistance 56 and the control grids 24 are connected to the negative terminal 58 of the bias resistance by a common conductor 61 including in series a resistance 62. Connecting each grid to the common conductor 61 is a current limiting resistor 63. With the above circuits, the control grids 24 are normally negative with respect to the cathodes 22. To remove this bias, a conductor 64 connects the mercury column 16 to the conductor 39 of the cathodes 22 at the positive terminal 57 of the bias resistance 56 and another conductor 65 connects the control grids to the switch contact 15 through the series current limiting resistors 63 thereof so that, when the switch is closed, the control grids and the cathodes are, in effect, tied together. Preferably, a stabilizing capacitor 66 of suitable value such as .02 microfarad is interposed between the positive terminal 57 of the bias resistor and the conductor 65 for the control grids.

The grid bias source 67 for the second rectifier 19 is generally similar to the source 54 described above and comprises a selenium rectifier 68 in series with the heater secondary winding 50 of the transformer 42 and a fixed bias resistance 70 having positive and negative terminals 71 and 72 and a filtering capacitor 73 connected across these terminals. When the switch 14 is opened the cathodes 43 are connected to the positive terminal 71 of the bias resistance and the control grids 53 are connected through current limiting resistors 74 to one terminal 75 of another resistor 76 whose other terminal 77 is connected to the positive terminal 71 of the bias resistor so that the cathodes and the control grids are in effect tied together and at the same potential. Closure of the switch 14 however completes a circuit through a conductor 78 from the negative terminal 72 of the bias resistance 70 to the terminal 75 at the junction between the current limiting resistors 74 of the control grids so that a negative potential is applied to the latter with respect to the cathodes.

In this instance, the values of the control grid resistors 63 and 74, the fixed bias resistors 56 and 70, and the resistance 62 in the first rectifier 18 are 10,000 ohms and the value of the resistance 76 between the control grids and the bias source of the second rectifier 19 is 1500 ohms. Preferably, a stabilizing capacitor 81 similar to the capacitor 66 described above is connected in parallel with the resistance 76 in the second rectifier.

In operation, assuming that the thyratron tubes have been heated properly through suitable time delay circuits (not shown) and that the switch 14 is open as shown in the drawing, the potentials on the control grids 24 of the tubes 21 of the first rectifier 18 are negative with respect to the cathodes 22 since the grids are connected to the negative terminal 58 of the bias resistance 56 and the cathodes are connected to the positive terminal 57. The tubes are thus prevented from conducting and the clutch winding 10 remains deenergized. At the same time, the control grids 53 and the cathodes 43 of the second rectifier tubes 38 are in effect tied together through the resistor 76 and have the same potential so that current flows through the tubes to energize the other clutch winding 11.

This condition prevails until the switch 14 is closed at which time the tubes 21 of the first rectifier 18 immediately become conductive since closure of the switch completes a circuit from the cathodes 22 directly to the current limiting resistors 63 in series with the control grids 24 so as to tie the latter and the cathodes together. Closure of the switch also completes a circuit including the conductor 78 and connecting the control grids 53 of the second rectifier tubes 38 to the negative terminal 72 of the bias resistance 70 so that the potential of the control grids is negative with respect to the cathodes and current flow through the tubes is blocked.

It will be apparent that, with the novel electronic control described above, one or the other of the clutch windings 10 and 11 will always be energized. By using the thyratron tubes to control such energization, it is possible to energize either of the latter almost instantaneously in response to actuation of a very sensitive switch. Thus, when the novel control is applied to a condition control system with the clutch armatures connected to the condition regulator such as the feed mechanism of a profiling machine and the switch 14 is responsive to condition changes, the windings will be alternately energized at a rapid rate, for example, 20 times per second, and the control device will be pulsated continuously back and forth in opposite directions and thus caused to follow closely changes in the position of the controlling instrumentality.

I claim as my invention:

1. In a control for two electromagnetic windings, the combination of, two control networks one for each winding and each including a thyratron tube having a control circuit and an output circuit, said windings being interposed in the respective output circuits for energization of one or the other of the windings when its associated tube is conducting, means including a switch arranged in the control circuit of one of said tubes to apply a negative voltage to the control grid of the tube and prevent conduction by the latter when the switch is open and to remove the negative voltage and permit conduction by the tube when the switch is closed, and means including said switch arranged in the control circuit of the other of said tubes to apply a negative voltage to the control grid of the tube and prevent conduction by the latter when the switch is closed and to remove the voltage to permit conduction by the tube when the switch is opened.

2. In a control for two electromagnetic windings, the combination of, two control networks one for each winding and each including a thyratron tube having a control circuit and an output circuit, said windings being interposed in the respective output circuits for energization of each winding when its associated tube is conducting, a switch having contacts adapted to be opened and closed, and means associated with said switch and governing said tube control circuits for applying a negative voltage to the control grid of one of said tubes to prevent conduction by the latter and removing negative voltage from the control grid of the other of said tubes to permit conduction thereby when the switch is open and removing the negative voltage from the first of said tubes to permit conduction thereby and applying a negative voltage to the control grid of said other tube to prevent conduction when the switch is closed.

3. In a control for two electromagnets, the combination of, two thyratron tubes one for each electromagnet and each having an input circuit and an output circuit, the output circuit of one tube including the winding of one of said electromagnets and the output circuit of the other tube including the winding of the other of said electromagnets, a switch having contacts adapted to be opened and closed, and means including said switch and controlling said input circuits to cause conduction in one tube and energization of its associated winding when the switch is open and conduction in the other tube and energization of its associated winding when the switch is closed.

4. In a control for electromagnetic windings, the combination of, a control network for one of said windings including a first electron tube rectifier having an output circuit arranged for energization of the winding when current is flowing through the rectifier, a second control network for another one of said windings including a second electron tube rectifier having an output circuit arranged for energization of the winding when current is flowing through the rectifier, a switch having contacts adapted to be opened and closed, and means for controlling said rectifiers including said switch and arranged to block the flow of current through said first rectifier and permit current flow through said second rectifier when said switch is closed and to block current flow through the second rectifier and permit current flow through the first rectifier when said switch is opened.

References Cited in the file of this patent

UNITED STATES PATENTS

| | | |
|---|---|---|
| 2,158,885 | Palmer | May 16, 1939 |
| 2,462,326 | Manoog | Feb. 22, 1949 |